United States Patent
Takasugi et al.

(10) Patent No.: US 8,857,695 B2
(45) Date of Patent: Oct. 14, 2014

(54) TOOL AND METHOD FOR FRICTION STIR PROCESSING USING THE FRICTION STIR PROCESSING TOOL

(75) Inventors: Takayuki Takasugi, Osaka (JP); Yasuyuki Kaneno, Osaka (JP); Sachio Oki, Osaka (JP); Tomotake Hirata, Osaka (JP); Noboru Mochizuki, Osaka (JP)

(73) Assignees: Osaka Prefecture University Public Corporation, Osaka (JP); Kinki University, Osaka (JP); Isel Co., Ltd, Osaka (JP)

( * ) Notice: Subject to any disclaimer, the term of this patent is extended or adjusted under 35 U.S.C. 154(b) by 0 days.

(21) Appl. No.: 14/006,194

(22) PCT Filed: Mar. 27, 2012

(86) PCT No.: PCT/JP2012/057940
§ 371 (c)(1),
(2), (4) Date: Oct. 17, 2013

(87) PCT Pub. No.: WO2012/133412
PCT Pub. Date: Oct. 4, 2012

(65) Prior Publication Data
US 2014/0027498 A1    Jan. 30, 2014

(30) Foreign Application Priority Data
Mar. 29, 2011   (JP) .................................. 2011-072460

(51) Int. Cl.
*B23K 20/12* (2006.01)
*C22C 19/03* (2006.01)
*C22C 19/00* (2006.01)
*C22F 1/10* (2006.01)

(52) U.S. Cl.
CPC .............. *B23K 20/125* (2013.01); *C22C 19/03* (2013.01); *C22C 19/007* (2013.01); *C22F 1/10* (2013.01); *B23K 20/1255* (2013.01)

USPC ........................................ 228/2.1; 228/112.1

(58) Field of Classification Search
None
See application file for complete search history.

(56) References Cited

U.S. PATENT DOCUMENTS 5,200,372 A * 4/1993 Kuroyama et al. .......... 501/96.4
6,306,524 B1 * 10/2001 Spitsberg et al. ............. 428/621
(Continued)

FOREIGN PATENT DOCUMENTS

EP          2551049 A  *  1/2013
JP       07-237011 A  *  9/1995
(Continued)

OTHER PUBLICATIONS

International Search Report for International Patent Application PCT/JP2012/057940 Mailed on Jul. 3, 2012.
(Continued)

*Primary Examiner* — Kiley Stoner
(74) *Attorney, Agent, or Firm* — Amin, Turocy & Watson, LLP

(57) ABSTRACT

A friction stir processing tool is formed from a Ni-based dual multi-phase intermetallic compound alloy containing rhenium(Re). The Ni-based dual multi-phase intermetallic compound alloy is preferably formed by casting, while gradually cooling, a melt containing all the components of the composition and is preferably heat treated after casting. Moreover, in a method for friction stir processing, a work is softened by friction heat generated when the friction stir processing tool, while rotating, is pressed against the work to be processed. The friction stir processing tool includes the Ni-based dual multi-phase intermetallic compound alloy, and therefore further high hardness is exhibited to improve abrasion resistance, so that even a long period of friction stir processing can be endured.

8 Claims, 14 Drawing Sheets

(56) References Cited

U.S. PATENT DOCUMENTS

| | | |
|---|---|---|
| 7,703,656 B2 * | 4/2010 | Park et al. ............... 228/2.1 |
| 2007/0119276 A1 | 5/2007 | Liu |
| 2008/0128472 A1 * | 6/2008 | Park et al. ............... 228/2.1 |
| 2008/0175745 A1 * | 7/2008 | Takasugi et al. .......... 420/460 |
| 2009/0068491 A1 * | 3/2009 | Maruko et al. ............ 428/615 |
| 2009/0308507 A1 * | 12/2009 | Chikugo et al. ........... 148/675 |
| 2010/0252614 A1 * | 10/2010 | Fujii et al. ............... 228/112.1 |
| 2011/0309131 A1 * | 12/2011 | Hovanski et al. .......... 228/124.1 |
| 2013/0189149 A1 * | 7/2013 | Takasugi et al. .......... 420/460 |
| 2014/0034709 A1 * | 2/2014 | Oki et al. ................ 228/112.1 |

FOREIGN PATENT DOCUMENTS

| | | |
|---|---|---|
| JP | 2003-175407 A * | 6/2003 |
| JP | 2006-320958 A * | 10/2006 |
| WO | WO 2009/119543 A1 * | 10/2009 |
| WO | WO 2011/118299 A1 * | 9/2011 |

OTHER PUBLICATIONS

International Preliminary Report on Patentability for International Patent Application PCT/JP2012/057940 mailed on Oct. 10, 2013.

* cited by examiner

Upper multi-phase constitution (SEM constitution)  Lower multi-phase constitution (TEM constitution)

| Alloys | Ni(at%) | Al(at%) | V(at%) | Ta(at%) | Re(at%) |
|---|---|---|---|---|---|
| Acicular particle | 29.7 | — | 15.8 | — | 53.5 |

FIG. 7

Test No. 1

Test No. 2

Test No. 3

Test No. 4

Test No. 5

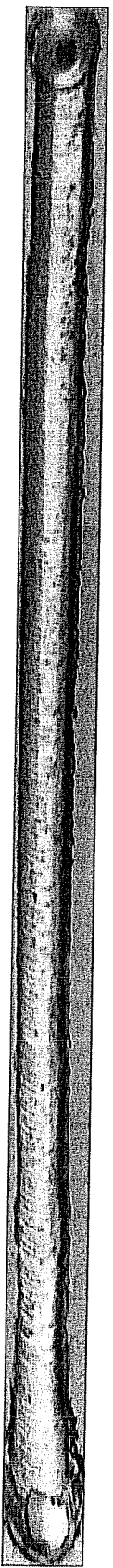
FIG. 14 Test No. 6
FIG. 15 Test No. 7

TOOL AND METHOD FOR FRICTION STIR PROCESSING USING THE FRICTION STIR PROCESSING TOOL

TECHNICAL FIELD

The present invention relates to a friction stir processing tool which is capable of subjecting a work of a metal material such as iron or an iron alloy to friction stir processing over a long period of time, and a method for friction stir processing using the friction stir processing tool.

BACKGROUND ART

There is a joining method in which when works such as aluminum alloy plates are joined, a rod-shaped tool (a tool having a shoulder portion having a large diameter and a probe projectingly provided at the tip thereof) rotating at a high speed is pressed against and inserted into one end of a butting portion formed by butting joint surfaces of the works, the tool, while rotating at a high speed, is moved to the other end along the butting portion, and the butting portion is softened by frictional heat generated at this time, thereby joining the works. This method is a technique called friction stir welding (FSW).

According to the friction stir welding, the maximum ultimate temperature does not reach a melting point and joining is performed in a solid phase state because joining is performed utilizing frictional heat between a tool and a work. Therefore, there is the advantage that as compared to melt-welding such as arc welding, a decrease in strength of a joint is small, joining defects such as voids and cracks do not occur, the joint surface is flat, and so on.

Further, there is a modification method in which a probe of a tool rotating at a high speed as described above is strongly pressed against and inserted into the surface of a work such as an aluminum alloy plate, the tool, while rotating at a high speed, is moved, and the work in the vicinity of a shoulder portion and the probe of the tool is softened by frictional heat generated at this time, thereby decreasing the crystal grain size of the work up to a certain depth to improve strength, hardness and the like. This method is called friction stir processing (FSP). Further, there is a spot joining method in which a tool is pressed against a work but is not laterally moved, and is pulled out as it is after a certain time. This method is called friction spot joining (FSJ). A process in which a rotating tool is strongly pressed against a work, and the work is processed by frictional heat thus generated as in the above-mentioned FSW, FSP, FSJ or the like is referred to as friction stir processing.

A tool made of steel such as SKD steel is used for a tool when aluminum or an aluminum alloy is used as a work in the friction stir processing. However, the tool made of steel such as SKD steel has the problem that it is soon deformed due to attrition or the like, so that joining cannot be performed. A tool made of ceramic has the problem that it is expensive and is easily broken, and it is easily worn away particularly when the work is stainless steel. If very small pieces of a material of a tool made of ceramic are dispersed in an iron-based work, for example stainless steel when the tool is worn away due to friction stir processing, mechanical properties and corrosion resistance may be degraded.

On the other hand, as a friction stir processing tool, one made of a Ni-based dual multi-phase intermetallic compound alloy has been proposed (for example Patent Document 1). The Ni-based dual multi-phase intermetallic compound alloy which is a material of this tool includes a $Ni_3Al$—$Ni_3Nb$—$Ni_3V$-based intermetallic compound alloy or a $Ni_3Al$—$Ni_3Ti$—$Ni_3V$-based intermetallic compound alloy. The Ni-based dual multi-phase intermetallic compound alloy is a multi-phase alloy formed by combining $Ni_3X$ type intermetallic compounds, and has excellent hardness as compared to an alloy formed of a single intermetallic compound phase. Therefore, a friction stir processing tool made of a Ni-based dual multi-phase intermetallic compound alloy, is particularly suitable for friction stir processing of a work of iron, an iron alloy or the like which requires a high processing temperature because necessary hardness is maintained even when the temperature is increased (to 800° C. or higher) by frictional heat during processing to the extent that the tool side face emits light in orange color.

RELATED ART DOCUMENT

Patent Document

Patent Document 1: Japanese Patent Laid-open Publication No. 2009-255170

SUMMARY OF THE INVENTION

Problems to be Solved by the Invention

The aforementioned friction stir processing tool including a Ni-based dual multi-phase intermetallic compound alloy, shows high hardness even at a high temperature, but when the tool is continuously used over a long period of time and resultantly tool abrasion proceeds, friction stir processing can no longer be properly performed with the tool, and no further use is possible. Accordingly, in the friction stir processing tool including a Ni-based dual multi-phase intermetallic compound alloy, it is desired to achieve further improvement of its properties, i.e. further high hardness, so that even when the tool is continuously used at a high temperature, tool abrasion can be kept low to increase a tool life.

The present invention has been devised in view of the above situations, and an object thereof is to provide a friction stir processing tool including a Ni-based dual multi-phase intermetallic compound alloy, wherein by exhibiting further excellent hardness even at a high temperature, tool abrasion is kept low to increase a tool life, and a method for friction stir processing using the tool.

Solutions to the Problems

Previously, a Ni-based dual multi-phase intermetallic compound alloy as a material of a friction stir processing tool has contained an element (e.g. Ta, Nb, Ti, etc.) to replace the X element of a $Ni_3X$ type intermetallic compound, but the present inventors have come up with the idea to include an element to replace the Ni element rather than the X element of the $Ni_3X$ type intermetallic compound, thus making it possible to achieve the aforementioned object.

That is, a friction stir processing tool according to the present invention includes a Ni-based dual multi-phase intermetallic compound alloy containing Re.

The Ni-based dual multi-phase intermetallic compound alloy contains 10 to 1000 ppm by weight of B based on the total weight of 100 atom % in total of a composition including Ni as a main component and 5 to 12 atom % of Al, 11 to 17 atom % of V and 1 to 5 atom % of Re, and has a dual multi-phase constitution of a proeutectoid $L1_2$ phase and a $(L1_2+D0_{22})$ eutectoid constitution.

Specifically, the Ni-based dual multi-phase intermetallic compound alloy preferably has a composition including 10 to 1000 ppm by weight of B based on the total weight of 100 atom % in total of a composition including Ni as a main component and 8 to 12 atom % of Al, 13 to 17 atom % of V and 1 to 5 atom % of Re, or a composition including 10 to 1000 ppm by weight of B based on the total weight of 100 atom % in total of a composition including Ni as a main component and 5 to 9 atom % of Al, 11 to 15 atom % of V, 3 to 7 atom % of Ta and 1 to 5 atom % of Re.

In the friction stir processing tool of the present invention, the Ni-based dual multi-phase intermetallic compound alloy is formed by casting, while gradually cooling, a melt containing all the components of the composition. In this case, the Ni-based dual multi-phase intermetallic compound alloy is preferably formed by performing a heat treatment (heat treatment at 1230 to 1330° C. or/and 800 to 1000° C.) after casting.

As another aspect of the present invention, there is provided a method for friction stir processing, wherein a work is softened by frictional heat generated when the friction stir processing tool, while rotating, is pressed against the work to be processed.

Effects of the Invention

According to the present invention, a friction stir processing tool includes a Ni-based dual multi-phase intermetallic compound alloy, and therefore further high hardness is exhibited to improve abrasion resistance, so that even a long period of friction stir processing can be endured. High hardness can be reliably exhibited by heat-treating the alloy material. Therefore, even a work of iron, an iron alloy or the like which requires a high processing temperature can be subjected to friction stir processing properly over a long period of time.

BRIEF DESCRIPTION OF THE DRAWINGS

FIG. 1 is a view showing a friction stir processing tool according to an embodiment:
FIG. 7 is a table showing ratios of elements in an acicular particle subjected to TEM-EDS analysis in FIG. 6.

FIG. 14 is a photograph obtained by photographing from the front side a joint of a flat plate material (test No. 6) obtained by friction stir welding in the 76th operation in Example.
FIG. 15 is a photograph obtained by photographing from the front side a joint of a flat plate material (test No. 7) obtained by friction stir welding in the 80th operation in Example.

EMBODIMENTS OF THE INVENTION

A friction stir processing tool (hereinafter, referred to a "tool" as appropriate) of this embodiment is a tool for softening a work of a metal material by frictional heat generated when the tool, while rotating, is pressed against the work to be processed. This tool is used for friction stir processing in general including friction stir welding (FSW), friction stir processing (FSP) and friction spot joining (FSJ) which have been described in Background Art. Herein, the "-(to)" means that both end values are included.

Figure 1A:
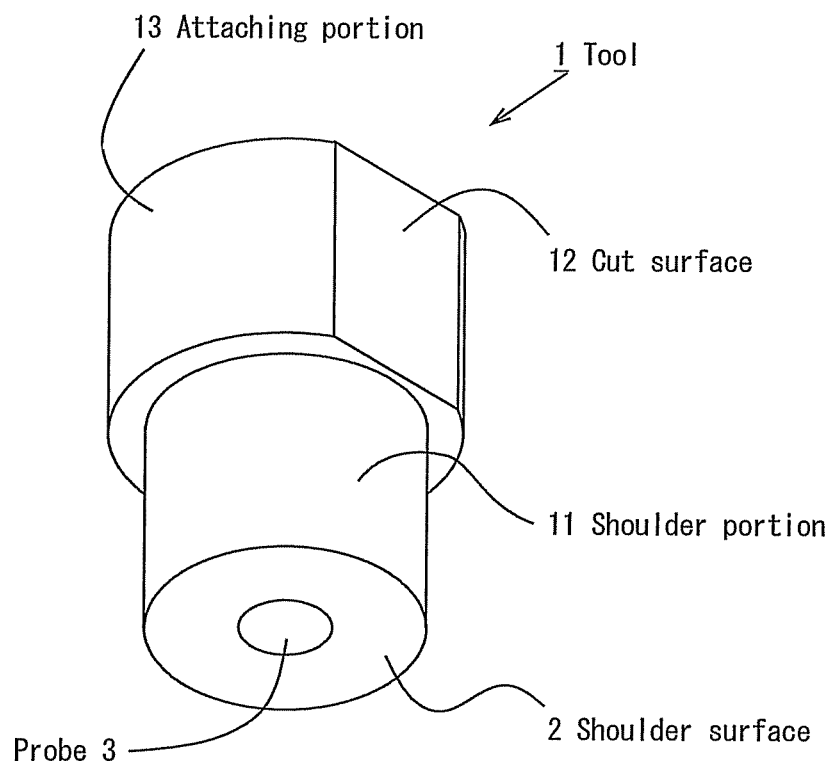
FIG. 1A is a perspective view of the tool.
Figure 1B:
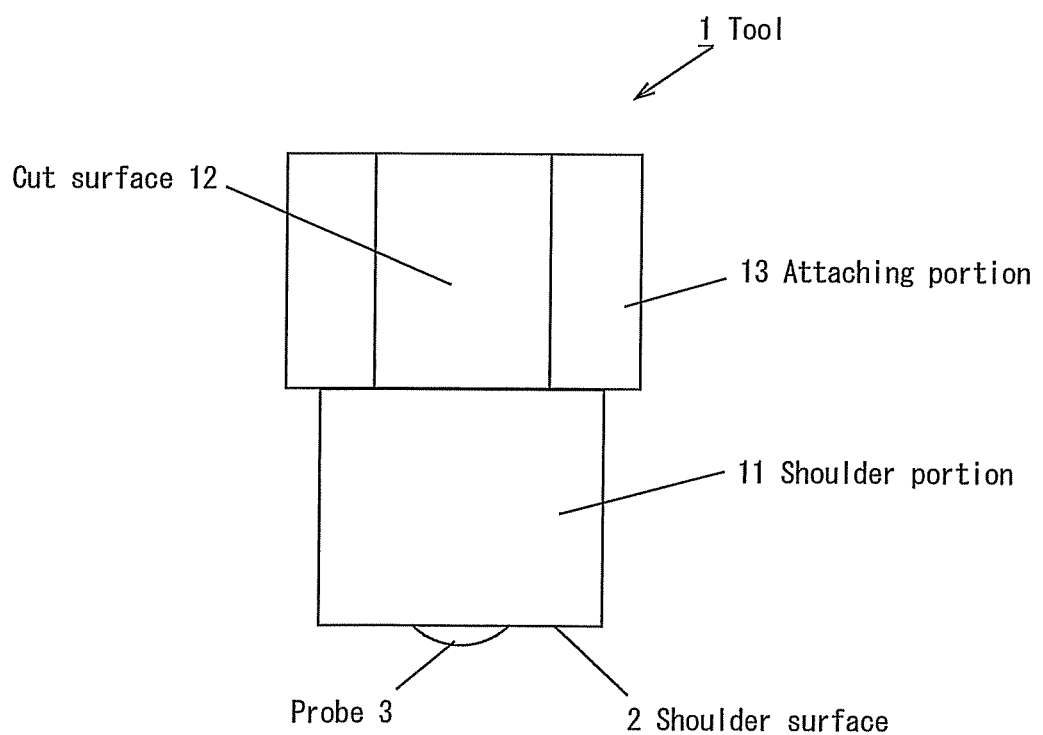
FIG. 1B is a side view of the tool.

As shown in FIGS. 1A and 1B, a friction stir processing tool 1 has a columnar shoulder portion 11, and a columnar attaching portion 13 having a diameter larger than that of the shoulder portion 11 and having a cut surface 12 formed on the side face. The attaching portion 13 of the friction stir processing tool 1 is put into a tool holder or the like of a friction stir processing apparatus, and tightened with a bolt abutted against the cut surface 12 of the attaching portion 13, so that the friction stir processing tool 1 is detachably attached. The end face of the shoulder portion 11 has a planar shoulder surface 2 and a spherical probe 3 projectingly provided at the central part of the shoulder face 2. At the time when a work is subjected to friction stir processing, the tool 1 presses the shoulder surface 2 and the probe 3 against the work while rotating to generate frictional heat. The shape of the tool 1 is limited to that in FIG. 1, and may be a shape with a flange formed between the shoulder portion 11 and the attaching portion 13, or the attaching portion 13 may be in a polygonal shape. The shoulder surface 2 is not limited to a planar shape, and may be formed in a slightly convex or slightly concave shape with the probe 3 situated at the center. Further, the probe 3 is not limited to a spherical shape, and may be in a columnar shape or a truncated cone shape, or may be screwed.

For the size of the friction stir processing tool 1, for example, the shoulder diameter (diameter of shoulder surface 2) is set to about 8 to 14 mm in the case of a work having a plate thickness of 1.5 mm or less. The probe diameter (diameter of the thickest portion of probe 3) is set to about 3 to 6 mm, and the length of the probe 3 (projecting height from shoulder surface 2), depending on the plate thickness of a work, is set to a such length that the probe 3 is deeply inserted into the work but its tip does not pass through the work to project therefrom. For example, the length of the probe 3 is set to a length smaller than the thickness of the work by about 0.1 to 0.2 mm.

The tool 1 is used by being attached to a known friction stir welding apparatus including machine three shafts: a platen shaft (X), a traverse shaft (Y) and a lifting shaft (Z). In processing of a work having a three-dimensional curved surface, the tool 1 is used by being attached to a known five shaft frame type friction stir welding apparatus including machine three shafts: a platen shaft (X), a traverse shaft (Y) and a lifting shaft (Z) and tool two shafts: a rocking shaft and a pivot shaft. The tool 1 is also used by being attached to a machine head mounted at the tip of a known robot arm including three joint shafts and two rotary shafts.

Next, as an example of the method for friction stir processing which uses the friction stir processing tool 1, for example, friction stir welding is performed in the following manner.

Figure 2:
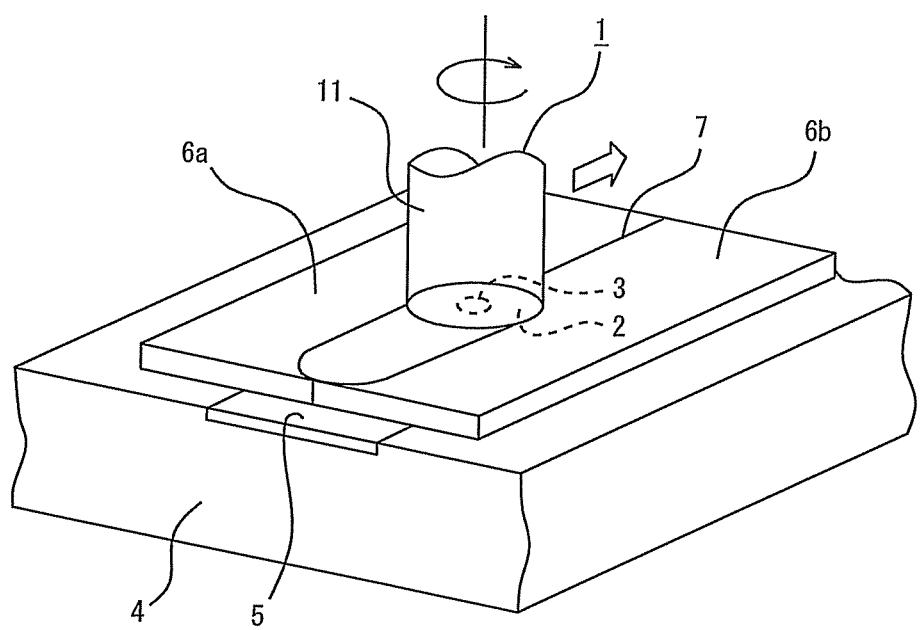
FIG. 2 is a schematic view showing an outline of a method for friction stir processing.

As shown in FIG. 2, when two plate-shaped bodies 6a and 6b are joined as a work, they are placed and fixed so that a butting portion 7 of the plate-shaped bodies 6a and 6b is situated on a backing material 5 arranged on a platen 4. Here, the backing material 5 is used for preventing contamination or the like from the back surface by friction stir welding, and preferably has heat resistance, nonflammability, strength, contamination resistance, surface smoothness and the like, and a plate, a molded product, a foil or the like, which is formed of a material such as a high-melting point metal, ceramic or silicon nitride, is used.

The probe 3 of the friction stir processing tool 1, while rotating at a high speed, is press-fitted to one end of the butting portion 7 of the plate-shaped bodies 6a and 6b, and pressed so that the shoulder surface 2 of the tool 1 comes into contact with the surfaces of the plate-shaped bodies 6a and 6b (70% in terms of a contact surface). Consequently, by friction between the probe 3 rotating at a high speed and the shoulder surface 2, the vicinity of the butting portion 7 of the plate-shaped bodies 6a and 6b is heated to be softened. The rotating friction stir processing 1 is moved toward the other end side along the butting portion 7 of the plate-shaped bodies 6a and 6b. Consequently, a portion including the butting portion 7 of the plate-shaped bodies 6a and 6b is softened by continuously generating heat by friction, and stirred so that the butting portion 7 of the plate-shaped bodies 6a and 6b are frictionally joined.

For joining conditions for the friction stir welding, for example, the forwarding speed of the tool 1 is preferably set to 900 to 1400 mm/min for processing iron or an iron alloy as a work with high quality. The rotation number of the tool 1 is preferably such a rotation number that when the tool 1 is brought into press-contact with a work of iron or an iron alloy, the work is heated to about 800° C. to about 1000° C. by frictional heat. For example, the rotation number is preferably set to 600 to 900 rpm. The lead angle of the tool 1 (inclination to the vertical line when the tip portion of the tool is inclined to the traveling direction side) is preferably set to 2 to 5°.

On the other hand, the material of the friction stir processing tool 1 includes a Ni-based dual multi-phase intermetallic compound alloy containing rhenium(Re). The Ni-based dual multi-phase intermetallic compound alloy includes Ni, V, Al, Ta (Ta is an optional component), B and Re (including unavoidable impurities) and has a dual multi-phase constitution of a proeutectoid $L1_2$ phase and a $(L1_2+D0_{22})$ eutectoid constitution.

A constitution of the Ni-based dual multi-phase intermetallic compound alloy will now be described.

Figure 3A:
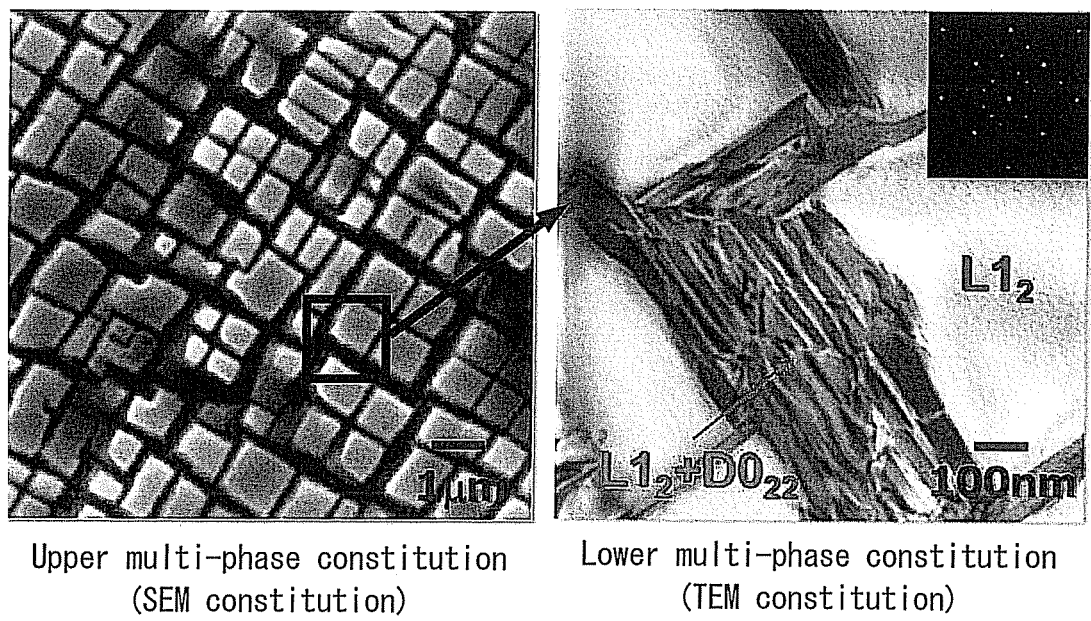
FIG. 3A shows a SEM photograph, a TEM photograph
Figure 3B:
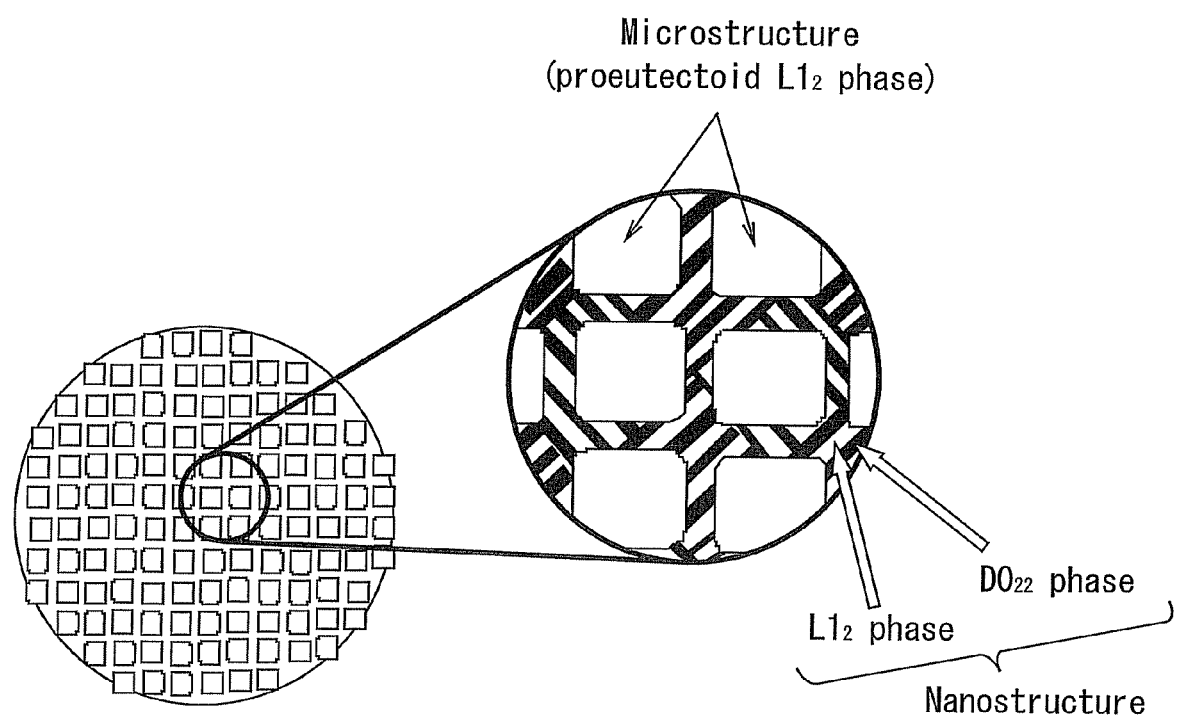
FIG. 3B shows a schematic view, for explaining a constitution of a Ni-based dual multi-phase intermetallic compound alloy.
Figure 4A:
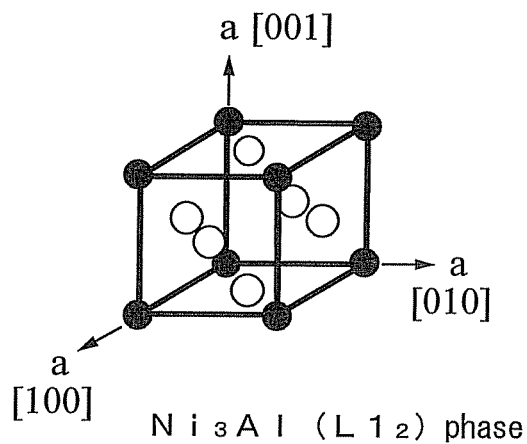
FIGS. 4A and 4B is a schematic view of a crystal structure which forms a constitution of a Ni-based dual multi-phase intermetallic compound alloy.
Figure 4B:
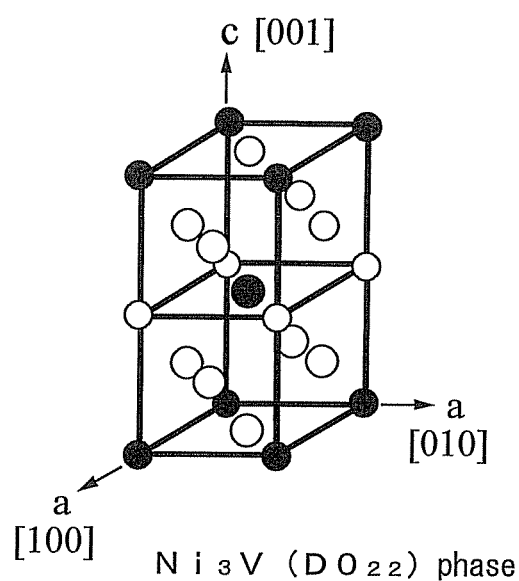

FIG. 3 shows the constitution of the Ni-based dual multi-phase intermetallic compound alloy: FIG. 3A shows a SEM photograph (left side) and a TEM photograph (right side) of the constitution; and FIG. 3B is a schematic view of the constitution. FIG. 4 shows a schematic view of a crystal structure of a phase which forms the constitution of the Ni-based dual multi-phase intermetallic compound alloy: FIG. 4A shows a $Ni_3Al$ ($L1_2$) phase; and FIG. 4B shows a $Ni_3V$ ($D0_{22}$) phase.

The constitution of the Ni-based dual multi-phase intermetallic compound alloy includes a cuboid microstructures formed with good consistency, and nanostructures formed between the microstructures. The former microstructure includes a cuboid proeutectoid $L1_2$ phase ($Ni_3Al$) and a channel portion which is a gap thereof. The latter nanostructure is formed in the channel portion, and includes a eutectoid constitution formed of a $L1_2$ phase and a $D0_{22}$ phase ($Ni_3Al$ and $Ni_3V$). In the Ni-based dual multi-phase intermetallic compound alloy, an upper multi-phase constitution with a proeutectoid $L1_2$ phase precipitated in an A1 phase (Ni solid solution phase) is formed by a heat treatment at a temperature higher than an eutectoid temperature, and by a subsequent heat treatment at a temperature equal to or lower than the eutectoid temperature, the A1 phase is eutectoid-transformed (decomposed) into two phases: a $L1_2$ phase and a $D0_{22}$ phase to form a lower multi-phase constitution. Here, the temperature higher than an eutectoid temperature is a temperature at which the proeutectoid $L1_2$ phase and the A1 phase coexist, and the eutectoid temperature is an upper limit value of the temperature at which the A1 phase is transformed (decomposed) into a $L1_2$ phase and a $D0_{22}$ phase. In this way, the Ni-based dual multi-phase intermetallic compound alloy is formed by diploidizing a $Ni_3X$ type intermetallic compound showing excellent properties.

Re (rhenium) is included as an element to replace the Ni element of the $Ni_3X$ type intermetallic compound in the Ni-based dual multi-phase intermetallic compound alloy. That is, by including Re in a Ni-based dual multi-phase intermetallic compound alloy containing Ni, Al and V, a Ni-based dual multi-phase intermetallic compound alloy having fine dual multi-phase constitutions is obtained, and the hardness of the alloy is improved. Further, by including Re in a Ni-based dual multi-phase intermetallic compound alloy containing Ta in addition to Ni, Al and V, the hardness of the alloy is further improved. B is added for enhancing the ductility of the obtained alloy by suppressing intergranular cracking.

By heat-treating a Ni-based dual multi-phase intermetallic compound alloy containing Re, the hardness of the alloy can be further improved while the dual multi-phase constitution is maintained. Accordingly, the alloy material before heat treatment is easily processed (e.g. cutting processing) into a tool shape, and hardness can be improved after the material is processed into a tool shape. Therefore, the friction stir processing tool 1 having excellent processability (e.g. cutting processability) and high hardness is obtained using the Ni-based dual multi-phase intermetallic compound alloy containing Re.

For example, the Ni-based dual multi-phase intermetallic compound alloy can be produced by the following production method.

Bare metals are weighed so that each element which forms the Ni-based dual multi-phase intermetallic compound alloy is in the ratio described above, and these base metals are heated to be melted. Next, the resulting melt is cooled to be cast. Cooling of the melt in the casting is performed by, for example, gradual cooling. When gradual cooling is performed, the melt is exposed for a relatively long time to a temperature at which a proeutectoid $L1_2$ phase and an A1 phase coexist after the melt is solidified, and thereafter the melt is also exposed for a long time to a temperature equal to or lower than an eutectoid temperature at which the A1 phase is separated into a $L1_2$ phase and a $D0_{22}$ phase. Accordingly, an upper multi-phase constitution including a proeutectoid $L1_2$ phase and an A1 phase is formed, and further the A1 phase is decomposed to form a lower multi-phase including a $L1_2$ phase and a $D0_{22}$ phase. The gradual cooling is performed by, for example, furnace cooling. That is, the materials are heated to be melted and after heating, the melt is left standing in the furnace.

The Ni-based dual multi-phase intermetallic compound alloy having the aforementioned constitutions is preferably heat-treated after casting. Here, as the heat treatment, a homogenization heat treatment, a solution heat treatment, an aging heat treatment, a first heat treatment, a second heat treatment and the like are shown as an example.

For example, a solution heat treatment (solution heat treatment for A1 haploidization) is performed. The solution heat treatment is performed at 1230 to 1330° C. Specifically, it is preferred to perform a heat treatment at a temperature of 1280° C. for about 5 hours. A homogenization heat treatment may be performed as another step before the solution heat treatment, or the solution heat treatment may also serve as a homogenization heat treatment. Cooling is performed after the solution heat treatment, and the cooling may be either natural cooling such as air cooling or forced cooling such as water cooling, and may be, for example, cooling by furnace cooling. By the solution heat treatment, the V element or the like is solid-dissolved in Ni to form an A1 phase (Ni solid solution phase), a $L1_2$ phase is precipitated in the A1 phase by subsequent cooling, and further the A1 phase is decomposed into a $L1_2$ phase and a $D0_{22}$ phase, so that a dual multi-phase constitution (constitution of proeutectoid $L1_2$ phase and ($L1_2+D0_{22}$) eutectoid constitution) is formed again. Accordingly, a Ni-based dual multi-phase intermetallic compound alloy including fine and uniform dual multi-phase constitutions is provided.

An alloy material (ingot, etc.) obtained by melting/solidification may be subjected to a first heat treatment at a temperature at which the proeutectoid $L1_2$ phase and the A1 phase coexist (formation of upper multi-phase constitution), and thereafter cooled to a temperature at which the $L1_2$ phase and the $D0_{22}$ phase coexist (natural cooling such as air cooling or furnace cooling, or forced cooling such as water cooling), or subjected to a second heat treatment at a temperature at which the $L1_2$ phase and the $D0_{22}$ phase coexist, thereby changing the A1 phase into a ($L1_2+D0_{22}$) eutectoid constitution (formation of lower multi-phase constitution). Here, the first heat treatment is performed at a temperature of, for example, 1230 to 1330° C., and specifically the heat treatment is performed at a temperature of 1280° C. for about 5 to 200 hours. The second heat treatment is performed at a temperature of, for example, 800 to 1000° C., and specifically the heat treatment is performed at a temperature of 930° C. for 5 to 200 hours. The solution heat treatment may also serve as the first heat treatment.

It is preferred to perform an aging heat treatment after the solution heat treatment. The aging heat treatment is performed for forming a $L1_2$ phase and a $D0_{22}$ phase by transforming (decomposing) an A1 phase formed in a gap of proeutectoid $L1_2$ phases in a Ni-based dual multi-phase intermetallic compound alloy, and therefore can be performed by carrying out a heat treatment in the same temperature range as in the second heat treatment. That is, preferably the aging heat treatment is at a temperature of 800 to 1000° C., preferably 825 to 1000° C. (850±25° C. or 975±25° C.) for about 0.5 to 24 hours for accelerating formation of a $L1_2$ phase and a $D0_{22}$ phase. The aging heat treatment may be performed after casting, or performed after the first or (and) second heat treatment. Herein, the aging heat treatment is also referred to as a lower multi-phase heat treatment (heat treatment for forming a lower multi-phase constitution).

Examples of the Ni-based dual multi-phase intermetallic compound containing Re, which forms the friction stir processing tool 1, include those that contain 10 to 1000 ppm by weight of B based on the total weight of 100 atom % in total of a composition including Ni as a main component and 5 to 12 atom % of Al, 11 to 17 atom % of V and 1 to 5 atom % of Re, and have a dual multi-phase constitution of a proeutectoid $L1_2$ phase and a ($L1_2+D0_{22}$) eutectoid constitution.

Specific examples of the Ni-based dual multi-phase intermetallic compound alloy include those that have a composition including 10 to 1000 ppm by weight of B based on the total weight of 100 atom % in total of a composition including Ni as a main component and 8 to 12 atom % of Al, 13 to 17 atom % of V and 1 to 5 atom % of Re, and unavoidable impurities, and have a dual multi-phase constitution of a proeutectoid $L1_2$ phase and a ($L1_2+D0_{22}$) eutectoid constitution.

The Ni-based dual multi-phase intermetallic compound alloy containing Re exhibits significantly high hardness due to formation of fine dual multi-phase constitutions, and therefore the friction stir processing tool 1 including the Ni-based dual multi-phase intermetallic compound alloy can be significantly improved in hardness. The Ni-based dual multi-phase intermetallic compound of the aforementioned composition is further significantly improved in hardness when subjected to an aging heat treatment (e.g. heat treatment at 800 to 1000° C.) after the solution heat treatment. Since the Ni-based dual multi-phase intermetallic compound alloy shows significantly high hardness at the temperature of the aforementioned heat treatment, the friction stir processing tool 1 which is also suitable for use at a high temperature (e.g. temperature of the aforementioned aging heat treatment) is obtained. It has been confirmed that the Ni-based dual multi-phase intermetallic compound alloy containing Re can exhibit a Vickers hardness of more than about 660 HV when subjected to an aging heat treatment, for example, at 900° C. for 5 to 10 hours (see sample No. 1 in Table 2 described later).

The Ni-based dual multi-phase intermetallic compound alloy containing Re, which forms the friction stir processing tool, may further contain Ta. Examples of the Ni-based dual multi-phase intermetallic compound alloy in this case include those that have a composition including 10 to 1000 ppm by weight of B based on the total weight of 100 atom % in total of a composition including Ni as a main component and 5 to 9 atom % of Al, 11 to 15 atom % of V, 3 to 7 atom % of Ta and 1 to 5 atom % of Re, and unavoidable impurities, and have a dual multi-phase constitution of a proeutectoid $L1_2$ phase and a ($L1_2+D0_{22}$) eutectoid constitution.

The Ni-based dual multi-phase intermetallic compound of the aforementioned composition, which contains Ta and Re, not only can be significantly improved in hardness when subjected to an aging heat treatment (e.g. heat treatment at 800 to 1000° C.) after a solution heat treatment, but also has excellent hardness after the solution heat treatment and before the aging heat treatment, and therefore the friction stir processing tool 1 including the Ni-based dual multi-phase intermetallic compound alloy containing Ta and Re can be significantly improved in hardness. Since the Ni-based dual multi-phase intermetallic compound alloy can also be significantly improved in hardness by the heat treatment while maintaining fine dual multi-phase constitutions, the friction stir processing tool 1 which is also suitable for use at a high temperature (e.g. temperature of the aforementioned aging heat treatment) is obtained. It has been confirmed that the Ni-based dual multi-phase intermetallic compound alloy containing Ta and Re can exhibit a Vickers hardness of more than about 780 HV when subjected to an aging heat treatment, for example, at 900 to 950° C. for 2 to 24 hours (see sample No. 2 in Tables 2 and 3 described later).

As described above, according to this embodiment, the Ni-based dual multi-phase intermetallic compound which forms the friction stir processing tool 1 is significantly improved in hardness while forming fine dual multi-phase constitutions when Re is added. Accordingly, in the friction stir processing tool 1, further excellent hardness is exhibited even at a high temperature during friction stir processing, so that tool abrasion by friction stir processing is kept low to increase a tool life. Therefore, even for a work of iron, an iron alloy or the like which requires a high processing temperature, the tool 1 can ensure a long period of friction stir processing, and friction stir processing can be performed with high quality over a long period of time. Further, since the tool replacement frequency is low, processing costs can be reduced. The iron alloy as used herein refers to an alloy containing iron as a main component and one or more other elements. Examples thereof include carbon steel and stainless steel.

EXAMPLE

The present invention will be described below by way of Example.

Reference Example

First, for a Ni-based dual multi-phase intermetallic compound alloy containing Re, which would be used as a material of a tool, alloy samples were prepared and the hardness thereof was examined for demonstrating that high hardness was exhibited.

(Preparation of Alloy Sample)

First, base metals of Ni, Al, V, Ta and Re in the ratio shown in Table 1 (each having a purity of 99.9% by weight) and B were melted and solidified in a mold within an arc melting furnace to prepare a cast material (button-shaped alloy of 30 to 50 mmφ). Then, test pieces (about 10 mm×5 mm×1 mm) were cut out from the prepared cast material, and the obtained test pieces were subjected to a heat treatment at 1280° C. for 5 hours as a solution heat treatment, followed by performing furnace cooling. Further, some of the test pieces subjected to the solution heat treatment were heat-treated at a temperature of 900° C. for 5, 10 and 24 hours and at a temperature of 950° C. for 2, 5, 10 and 24 hours, respectively, as a lower multi-phase heat treatment (aging treatment), and water quenching was performed.

TABLE 1

| Sample No. | Ni | Al | V  | Ta | Re | B  |
|------------|----|----|----|----|----|----|
| No. 1      | 72 | 10 | 15 | 0  | 3  | 50 |
| No. 2      | 72 | 7  | 13 | 5  | 3  | 50 |

TABLE 1-continued

| Sample No. | Ni | Al | V  | Ta | Re | B  |
|------------|----|----|----|----|----|----|
| No. 3      | 75 | 6  | 14 | 5  | 0  | 50 |
| No. 4      | 75 | 8  | 17 | 0  | 0  | 50 |

The ratios of Ni, Al, V, Ta and Re are in atom %.
The ratio of B is in ppm by weight based on the total weight of 100 atom % in total of the composition including Ni, Al, V, Ta and Re.

(Constitution Observation)

For both samples No. 1 (containing Re) and No. 2 (containing Re and Ta), a constitution observation was performed by SEM after a solution heat treatment was performed and after a lower multi-phase heat treatment was performed subsequently to the solution heat treatment, and it was found that in all the samples, a cuboid constitution in a dual multi-phase constitution is fractionally small in size as compared to the dual multi-phase constitution of a Ni-based dual multi-phase intermetallic compound alloy containing no Re ($Ni_{75}Al_8V_{14.5}Nb_{2.5}$), and those samples were formed of ultrafine dual multi-phase constitutions. These results showed that Re affected the size of the dual multi-phase constitution, and when Re was added, fine dual multi-phase constitutions were formed while dual multi-phase constitutions were maintained.

Figure 5:
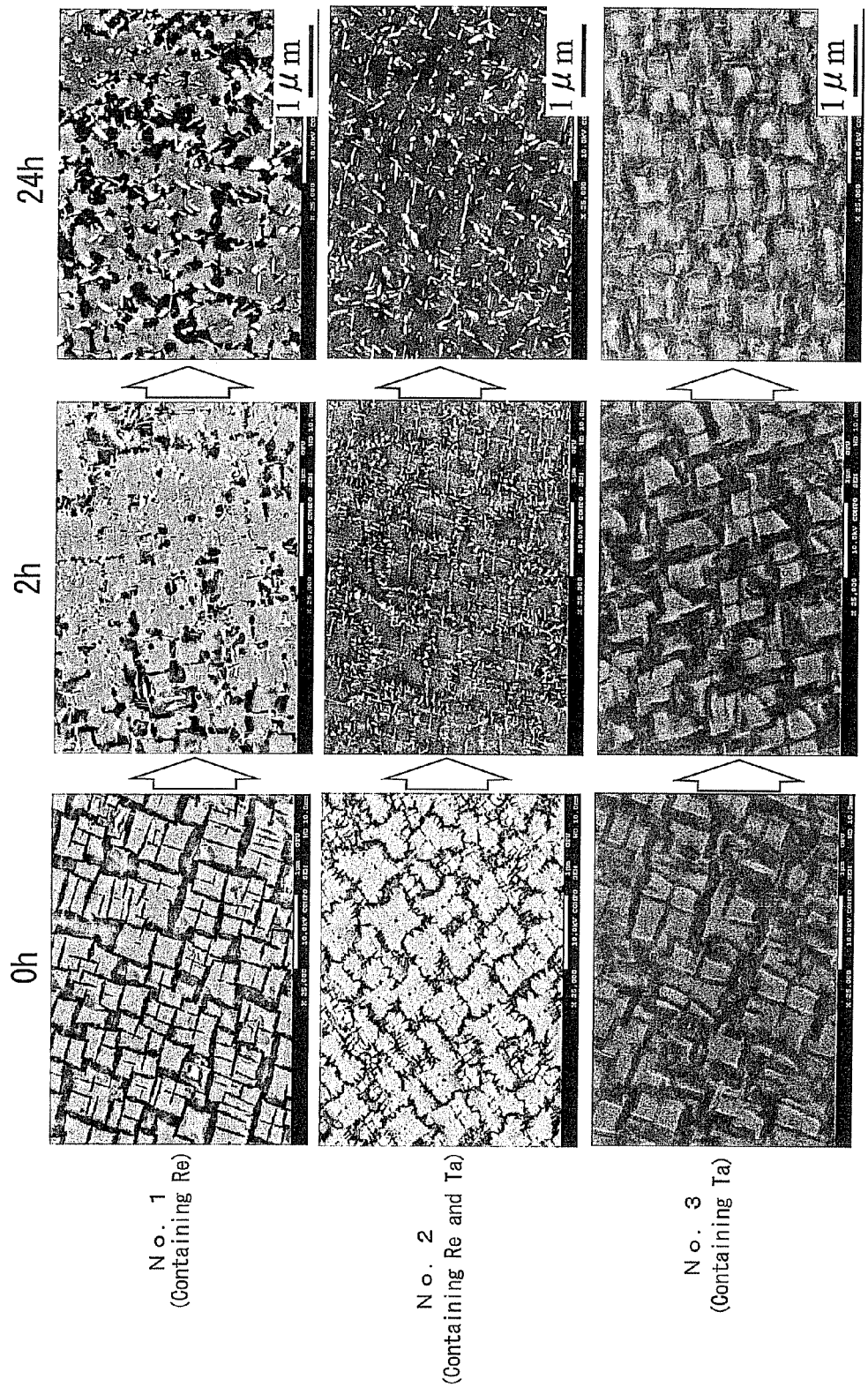
FIG. 5 is a SEM photograph showing a constitutional change when only a solution heat treatment is performed (0 h), and an aging heat treatment (lower multi-phase heat treatment) at 950° C. is performed for 2 hours (2 h) and 24 hours (24 h) in addition to the solution heat treatment in each of samples No. 1, No. 2 and No. 3.

FIG. 5 shows SEM photographs of samples No. 1 (containing Re), No. 2 (containing Re and Ta) and No. 3 (containing Ta), where for each sample, only a solution heat treatment was performed (0 h), and an aging treatment (lower multi-phase heat treatment) was performed at 950° C. for 2 hours (2 h) and for 24 hours (24 h) in addition to the solution heat treatment. As is apparent from FIG. 5, fine acicular particles (second phase particles) are precipitated at channel portions as a result of the aging heat treatment in samples No. 1 and No. 2, each of which is a Ni-based dual multi-phase intermetallic compound alloy containing Re (see 2 h and 24 h in No. 1 and No. 2 in FIG. 5), but precipitation of such acicular particles is not found in the sample. No. 3 which is a Ni-based dual multi-phase intermetallic compound alloy containing Ta (see 2 h and 24 h in No. 3 in FIG. 5). Here, the channel portion is a portion of a gap of the cuboid proeutectoid $L1_2$ phase.

Figure 6A:
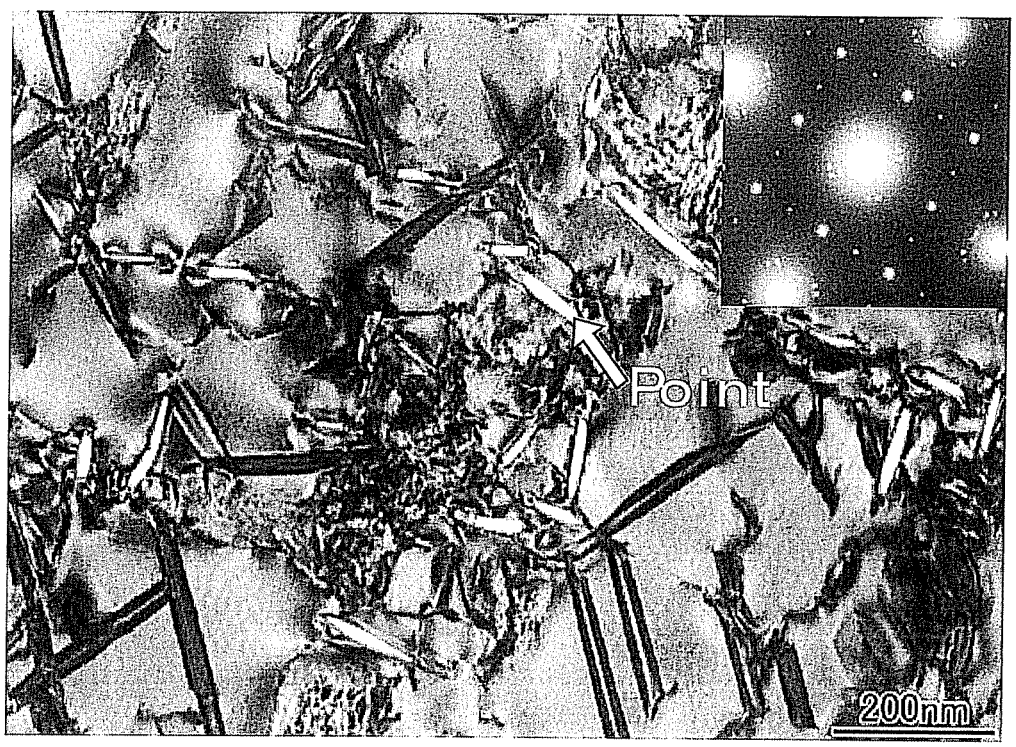
FIG. 6A is a TEM photograph and FIG. 6B is a profile of EDS detection, showing results of TEM-EDS analysis of acicular particles precipitated when a solution heat treatment and an aging heat treatment (lower multi-phase heat treatment) at 950° C. are performed for 2 hours in the sample No. 2.
Figure 6B:
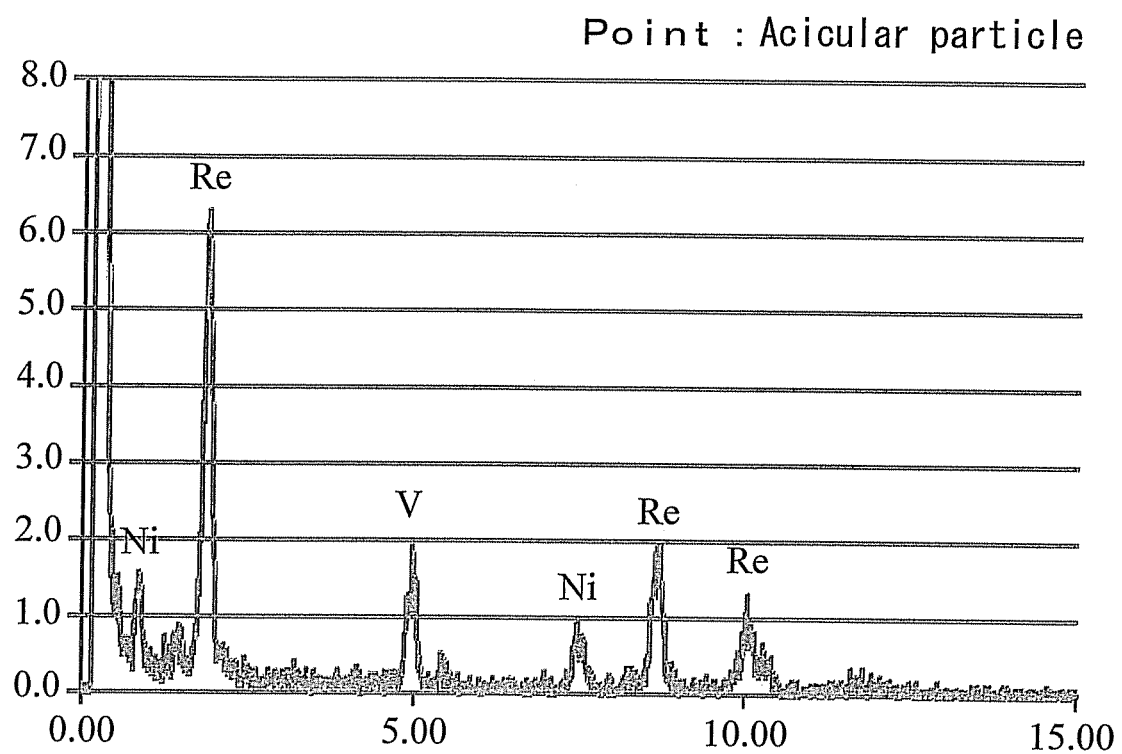

Then, TEM-EDS analysis was performed for the acicular particles. For the sample No. 2 (containing Re and Ta) (for which the aging heat treatment was performed for 2 hours after the solution heat treatment), EDS analysis of the acicular particle specified by "point" in TEM of FIG. 6A. FIG. 6B shows a profile of elementary analysis by this TEM-EDS analysis. FIG. 7 shows ratios of elements in the acicular particle subjected to TEM-EDS analysis. From FIG. 7, it is apparent that the acicular particle contains 53.5 atom % of Re, and thus has a Re-rich composition.

(Vickers Hardness Test)

Figure 8:
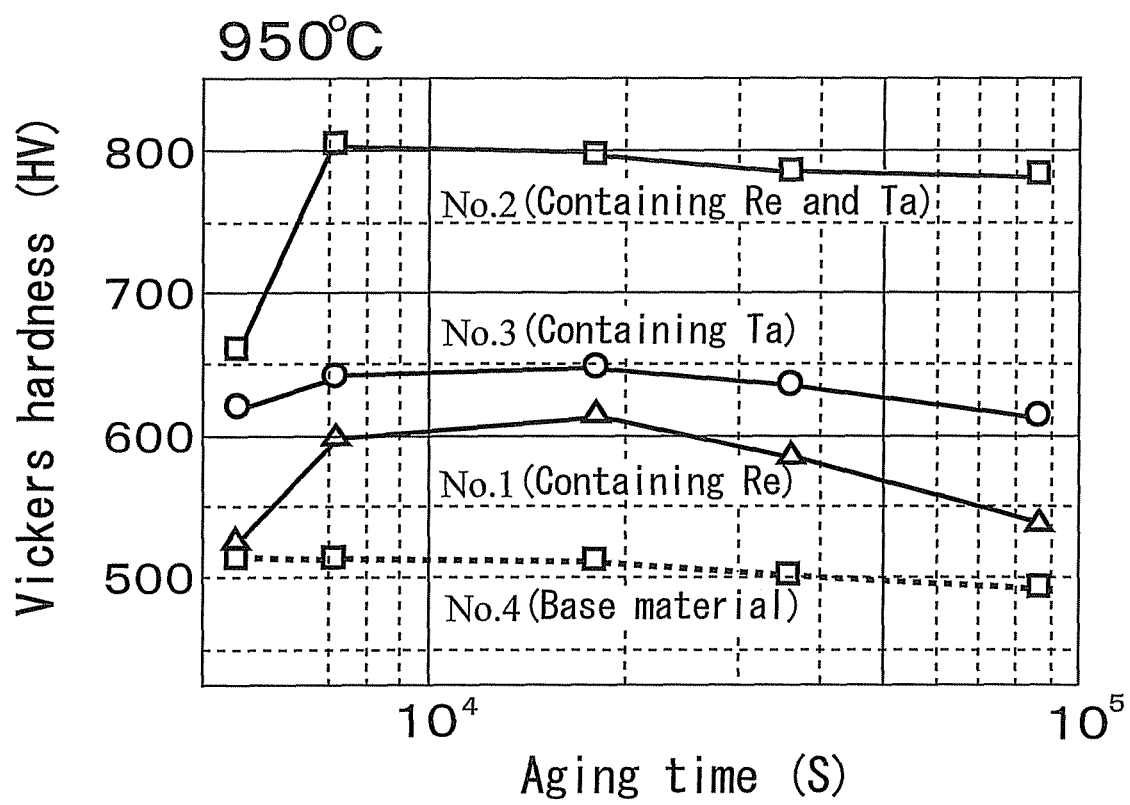
FIG. 8 is a graph showing a relationship between an aging heat treatment (lower multi-phase heat treatment) time and a Vickers hardness in samples No. 1, No. 2, No. 3 and No. 4.
Figure 9:
FIG. 9 is a photograph obtained by photographing from the front side a joint of a flat plate material (test No. 1) obtained by friction stir welding in the 12th operation in Example.
Figure 10:
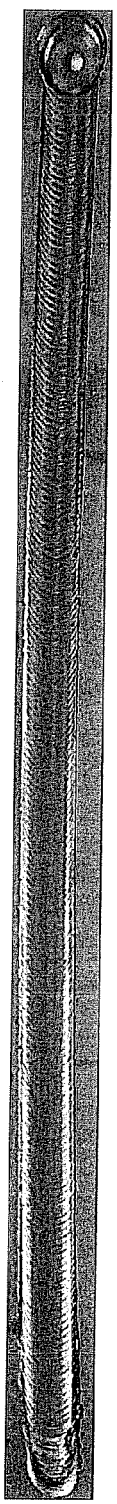
FIG. 10 is a photograph obtained by photographing from the front side a joint of a flat plate material (test No. 2) obtained by friction stir welding in the 17th operation in Example.
Figure 11:
FIG. 11 is a photograph obtained by photographing from the front side a joint of a flat plate material (test No. 3) obtained by friction stir welding in the 43rd operation in Example.
Figure 12:
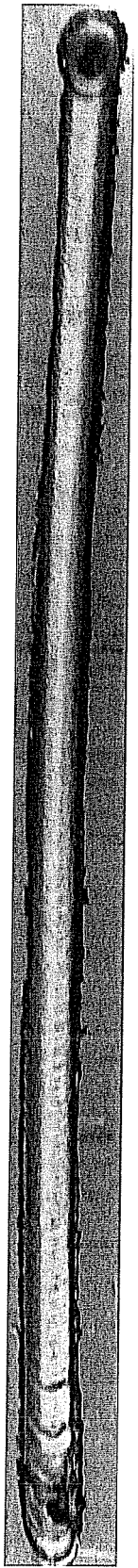
FIG. 12 is a photograph obtained by photographing from the front side a joint of a flat plate material (test No. 4) obtained by friction stir welding in the 49th operation in Example.
Figure 13:
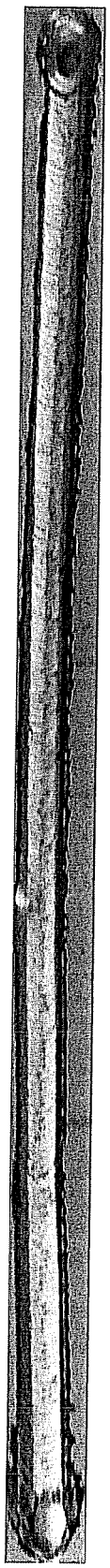
FIG. 13 is a photograph obtained by photographing from the front side a joint of a flat plate material (test No. 5) obtained by friction stir welding in the 59th operation in Example.

Vickers hardness was measured for samples No. 1 (containing Re), No. 2 (containing Re and Ta), No. 3 (containing Ta) and No. 4 (containing neither Re nor Ta: base material) Vickers hardness was measured principally with a load of 1000 g (1 kg) and a retention time of 20 seconds, and the measurement was performed at room temperature (about 25° C.). The results are shown in Tables 2 and 3. FIG. 8 shows the measurement results in Table 3 in a graphical form.

TABLE 2

| Samples | Conditions | Solution heat treatment | Lower multi-phase heat treatment (aging heat treatment) | | |
|---|---|---|---|---|---|
| | Temperature (° C.) | 1280 | 900 | 900 | 900 |
| | Time (h) | 5 | 5 | 10 | 24 |
| No. 1 | Hardness (HV) | 527 | 661 | 663 | 635 |
| No. 2 | | 660 | 801 | 815 | 787 |
| No. 3 | | 620 | 654 | 644 | 653 |
| No. 4 | | 514 | — | — | — |

TABLE 3

| Samples | Conditions | Solution heat treatment | Lower multi-phase heat treatment (aging heat treatment) | | | |
|---|---|---|---|---|---|---|
| | Temperature (° C.) | 1280 | 950 | 950 | 950 | 950 |
| | Time (h) | 5 | 2 | 5 | 10 | 24 |
| No. 1 | Hardness (HV) | 527 | 599 | 614 | 587 | 540 |
| No. 2 | | 660 | 805 | 797 | 786 | 783 |
| No. 3 | | 620 | 643 | 648 | 636 | 614 |
| No. 4 | | 514 | 515 | 513 | 503 | 494 |

For both samples No. 1 (containing Re) and No. 2 (containing re and Ta), each of which is a Ni-based dual multi-phase intermetallic compound alloy containing Re, the value of Vickers hardness was significantly increased by a lower multi-phase heat treatment for several hours. For example, as is apparent from Table 2, the value of Vickers hardness was increased by about 130 HV for the sample No. 1 and by about 140 HV for the sample No. 2 by a lower multi-phase heat treatment at 900° C. for 5 hours. As is apparent from tables 2 and 3, the sample No. 2 showed a high value of 660 HV when subjected to only a solution heat treatment, and showed a hardness of more than 780 HV when further subjected to a lower multi-phase heat treatment at either 900° C. or 950° C. (797 HV or more when subjected to a lower multi-phase heat treatment for 2 to 5 hours).

For the post-casting sample of the alloy of the sample No. 2 (sample where the solution heat treatment was omitted by exposing the alloy to a temperature at which the proeutectoid $L1_2$ phase and the A1 phase coexisted and a temperature equal to or lower than an eutectoid temperature at which the A1 phase was separated into a $L1_2$ phase and a $D0_{22}$ phase, for a long time, by gradually cooling the alloy when it was cast using a ceramic mold method), Vickers hardness was measured, and it was confirmed that a high value of 662 HV was shown.

As is apparent from Table 3 and FIG. 8, the sample No. 4 (base material) which is a Ni-based dual multi-phase intermetallic compound alloy containing neither Re nor Ta, even when an aging heat treatment is performed, Vickers hardness was little different from that when only a solution heat treatment is performed, and for the sample No. 3 (containing Ta) which is a Ni-based dual multi-phase intermetallic compound alloy containing Ta, Vickers hardness is improved as compared to the sample No. 4 (base material) due to Ta solid-solution strengthening, but Vickers hardness is only slightly increased even when the aging heat treatment is performed.

In contrast, for samples No. 1 (containing Re) and No. 2 (containing Re and Ta), each of which is a Ni-based dual multi-phase intermetallic compound alloy containing Re, when an aging heat treatment was performed, Vickers hardness was considerably increased, and particularly for the sample No. 2 containing both Re and Ta, a high hardness of more than 800 HV was achieved.

From the results described above, it has been confirmed that in a Ni-based dual multi-phase intermetallic compound alloy containing Re, fine dual multi-phase constitutions are formed to increase the value of Vickers hardness as compared to one that does not contain Re.

Further, it has been confirmed that a Ni-based dual multi-phase intermetallic compound alloy is significantly increased in Vickers hardness when subjected to an aging heat treatment (lower multi-phase heat treatment). This is because as shown in FIGS. 5 and 6, when an aging heat treatment is performed, a Ni solid solution phase is transformed into an intermetallic compound such as $Ni_3V$ or $Ni_3Al$ (regularity strengthening), and Re is precipitated as fine acicular particles (second phase particles) of a Re-rich composition (precipitation strengthening) at the channel portion of the alloy constitution, thereby causing age hardening (mechanism of age hardening by addition of Re).

It has been confirmed that in the case of a Ni-based dual multi-phase intermetallic compound alloy containing Re and Ta, a high value of Vickers hardness is shown even when only a solution heat treatment is performed, and a further high value of Vickers hardness is shown when an aging heat treatment is further performed. This is because Ta improves hardness by solid-solution strengthening (mechanism of hardening by addition of Ta). As a result, the hardness of the Ni-based dual multi-phase intermetallic compound alloy is considerably improved due to an effect of superposition of solid-solution strengthening by addition of Ta and precipitation strengthening by addition of Re.

As described above, when Re is added to a Ni-based dual multi-phase intermetallic compound alloy and a desired heat treatment is performed, fine acicular particles (second phase particles) of a Re-rich composition are precipitated, whereby the hardness property of the Ni-based dual multi-phase intermetallic compound alloy can be considerably enhanced. Accordingly, the friction stir processing tool 1 including a Ni-based dual multi-phase intermetallic compound alloy containing Re has high hardness, has low abrasion and a long life, and can be dramatically improved in tool properties.

From FIG. 41 in Patent Document 1 (Japanese Patent Laid-open Publication No. 2009-255170), it has been known that even in a high temperature range (300 to 900° C.), the value of Vickers hardness of a Ni-based dual multi-phase intermetallic compound alloy is not rapidly reduced as compared to hardness at normal temperature, and is kept high. Accordingly, it is confirmed that the friction stir processing tool 1 including a Ni-based dual multi-phase intermetallic compound alloy containing Re retains high hardness even under a high temperature.

Example

Next, the following experiments were conducted for confirming the effect of a friction stir processing tool including a Ni-based dual multi-phase intermetallic compound alloy containing Re, with which the tool life is increased and proper friction stir welding can be performed over a long period of time.

(Preparation of Friction Stir Processing Tool)

Base metals of Ni, Al, V, Ta and Re (each having a purity of 99.9% by weight) and B were weighed so as to have a composition including 72 atom % of Ni, 7 atom % of Al, 13 atom % of V, 5 atom % of Ta, 3 atom % of Re and 50 ppm by weight of B, and treated by a vacuum induction melting method to prepare 0.3 kg of an ingot (cast raw material). The cast raw material was cutting-processed into a tool shape shown below, and then subjected to a heat treatment at a temperature of 950° C. for 5 hours as an aging heat treatment (lower multi-phase heat treatment) to prepare the present friction stir welding tool 1 shown in FIG. 1.

(Shape of Friction Stir Processing Tool)

A shoulder surface 2 is a circular flat surface having a diameter of 12 mm, and a probe 3 provided at its center is configured such that a spherical surface having a radius of 2 mm partially projects from the shoulder surface 2. The diameter of the bottom part of the probe 3 is about 4 mm, the length from the shoulder surface 2 to the tip of the probe 3 (projecting height, probe length) is 0.81 mm.

(Friction Stir Processing (Friction Stir Welding))

Friction stir processing (friction stir welding by butting joint) was performed by a method shown in FIG. 2 using the friction stir processing tool 1. At this time, the tool 1 was attached to a friction stir welding apparatus including three shafts: a platen shaft (X), a traverse shaft (Y) and a lifting shaft (Z). During friction stir welding processing, an argon gas flows down along the tool side face to encompass the tool 1.

As shown in FIG. 2, on a platen 4 made of steel (S50C), three square poles (30 mm square, length 100 mm) made of silicon nitride, which had a smooth surface, were fixedly arranged side by side in the lengthwise direction as a backing material 5. The silicon nitride as a material of the backing material 5 include, as main components, 90% by weight of $Si_3N_4$, 4 to 5% by weight of $Al_2O_3$, 4 to 5% by weight of $Y_2O_3$ and so on.

As a work, two flat plate materials 6a and 6b made of SUS 430 (length: 300 mm, width: 75 mm and thickness: 1.0 mm) were placed and fixed on the backing material 5, with their joint surfaces butted to each other.

(Welding Conditions)

As conditions for friction stir welding, the tool 1, while rotating at a high speed of a tool rotation number of 600 to 900 rpm with a lead angle of 3 degrees, was pressed onto a joining line (butting portion 7) of two flat plate materials 6a and 6b, and after the tool 1 emitted light in orange color by frictional heat, the tool 1 rotating at a tool forwarding speed of 900 to 1400 mm/min was linearly moved to perform friction stir welding of the joining line at which two flat plate materials 6a and 6b were butted to each other. The load on the tool 1 during the processing was set to 0.8 to 1.05 ton. The working distance of one operation of the friction stir welding was set to 250 mm, and 80 operations were performed (total working distance: 20000 mm). The friction stir welding condition was set to a fixed set value within the aforementioned conditions in one operation (friction stir welding operation with a working distance of 250 mm).

FIGS. 9 to 15 show photographs of the joining portion of flat plate materials 6a and 6b when the number of times of the welding operation reached a predetermined number of times (see "number of times of operations" in Table 4) as test Nos. 1 to 7, and the working state of the friction stir welding was good in terms of appearance in all of initial, middle and last stages of the welding operation. Thus, according to the tool 1 by this Example, the tool 1 endured a long period of friction stir welding, and a good finishing state could be ensured over a long period of time.

(Tensile Test)

For flat plate materials 6a and 6b after the friction stir welding, a sample was prepared in a direction orthogonal to the joining direction, and a tensile test was conducted for examining the strength of the joining portion. The sample had a width of 24.6 mm and a gauge length of 50 mm in accordance with the shape of test pieces in JIS Z No. 22015. The cross head speed during measurement was 20 mm/min.

The results of the measurements described above are shown in Table 4 together with the number of times of operations and friction, stir welding conditions.

TABLE 4

| Test No. | Number of times of operations | Number of rotations rpm | Speed mm/min | Pressure ton | Lead angle ° | Working distance (integrated) mm | Tensile test Tensile stress MPa |
|---|---|---|---|---|---|---|---|
| | | | | FSW conditions | | | Tensile |
| 1 | 12 | 900 | 1350 | 1.05 | 3 | 250 (2750-3000) | 555 |
| 2 | 17 | 900 | 1150 | 0.9 | 3 | 250 (4000-4250) | 537 |
| 3 | 43 | 640 | 900 | 0.8 | 3 | 250 (10500-10750) | 548 |
| 4 | 49 | 640 | 900 | 0.8 | 3 | 250 (12000-12250) | 546 |
| 5 | 59 | 680 | 900 | 0.8 | 3 | 250 (14500-14750) | 554 |
| 6 | 76 | 700 | 900 | 0.85 | 3 | 250 (18750-19000) | 549 |
| 7 | 80 | 700 | 900 | 0.85 | 3 | 250 (19750-20000) | 564 |

As is apparent from Table 4, for the tensile strength, a strength of 537 MPa or more was achieved over the whole working distance. Joining materials, for which the working distance of the tool was long, i.e. 18750 to 19000 mm (test No. 6) and 19750 to 20000 mm (test No. 7), had a tensile strength of 549 MPa (test No. 6) and of 564 MPa (test No. 7), and joining materials, for which the working distance was short, i.e. 2750 to 3000 mm (test No. 1) and 4000 to 4250 mm (test No. 2), had a comparable tensile strength of 555 MPa (test No. 1) and of 537 MPa (test No. 2). Accordingly, proper welding processing was performed even when the working distance was long. Further, from this result, it has become apparent that sufficient strength which is not poor in comparison with the SUS 430 base material could be obtained because the tensile strength of the SUS 430 base material was 519 MPa as an average of n=3.

For abrasion of the tool 1, the result of measuring the weight of the tool 1 and the height of the probe 3 showed that after 80 times of working operations (working distance: 20000 mm) were performed, the weight of the tool 1 was decreased by 0.1 g and the height of the probe was decreased by 0.02 mm as compared to the unused state, but the tool 1 was not significantly worn away, and therefore tool abrasion was kept low.

As described above, it was demonstrated in this experiment that the tool (tool including a Ni-based dual multi-phase intermetallic compound alloy containing Re) of Example was satisfactory in working condition in terms of appearance and joining strength even when the working distance of friction welding of a SUS 430 flat plate material reached 20000 mm, and therefore the tool life was extremely increased.

| DESCRIPTION OF REFERENCE SIGNS | |
| --- | --- |
| 1 | Friction stir processing tool |
| 2 | Shoulder surface |
| 3 | Probe |
| 4 | Platen |
| 5 | Backing material |
| 6a, 6b | Flat plate material (work) |
| 7 | Butting portion |
| 11 | Shoulder portion |
| 12 | Cut surface |
| 13 | Attaching portion |

The invention claimed is:

1. A friction stir processing tool comprising: a Ni-based dual multi-phase intermetallic compound alloy containing 10 to 1000 ppm by weight of B based on the total weight of 100 atom % in total of a composition including Ni as a main component and 5 to 12 atom % of Al, 11 to 17 atom % of V and 1 to 5 atom % of Re, and having a dual multi-phase constitution of a proeutectoid $L1_2$ phase and a $(L1_2+D0_{22})$ eutectoid constitution.

2. The friction stir processing tool according to claim 1, wherein the Ni-based dual multi-phase intermetallic compound alloy contains 10 to 1000 ppm by weight of B based on the total weight of 100 atom % in total of a composition including Ni as a main component and 8 to 12 atom % of Al, 13 to 17 atom % of V and 1 to 5 atom % of Re.

3. The friction stir processing tool according to claim 1, wherein the Ni-based dual multi-phase intermetallic compound alloy contains 10 to 1000 ppm by weight of B based on the total weight of 100 atom % in total of a composition including Ni as a main component and 5 to 9 atom % of Al, 11 to 15 atom% of V, 3 to 7 atom % of Ta and 1 to 5 atom % of Re.

4. The friction stir processing tool according to claim 1, wherein the Ni-based dual multi-phase intermetallic compound alloy is formed by casting, while gradually cooling, a melt containing all the components of the composition.

5. The friction stir processing tool according to claim 1, wherein the Ni-based dual multi-phase intermetallic compound alloy is formed by performing a heat treatment at 1230 to 1330° C.

6. The friction stir processing tool according to claim 1, wherein the Ni-based dual multi-phase intermetallic compound alloy is formed by performing a heat treatment at 800 to 1000° C.

7. A method for friction stir processing, wherein a work is softened by frictional heat generated when the friction stir processing tool according to claim 1, while rotating, is pressed against the work to be processed.

8. The friction stir processing tool according to claim 1, wherein second phase particles of a Re-rich composition are precipitated in the constitution of the Ni-based dual multi-phase intermetallic compound alloy.

\* \* \* \* \*